(12) United States Patent
Gavin et al.

(10) Patent No.: US 11,794,993 B2
(45) Date of Patent: Oct. 24, 2023

(54) AUTONOMOUSLY PROPELLED WASTE RECEPTACLE AND ASSOCIATED METHODS

(71) Applicants: Jamison F. Gavin, Coral Springs, FL (US); Tahri E. Turner, Roswell, GA (US)

(72) Inventors: Jamison F. Gavin, Coral Springs, FL (US); Tahri E. Turner, Roswell, GA (US)

(*) Notice: Subject to any disclaimer, the term of this patent is extended or adjusted under 35 U.S.C. 154(b) by 633 days.

(21) Appl. No.: 17/074,013

(22) Filed: Oct. 19, 2020

(65) Prior Publication Data

US 2021/0047110 A1    Feb. 18, 2021

(51) Int. Cl.
| | |
|---|---|
| *B65F 3/20* | (2006.01) |
| *G05D 1/02* | (2020.01) |
| *B30B 1/18* | (2006.01) |
| *B65F 3/14* | (2006.01) |

(52) U.S. Cl.
CPC .......... *B65F 3/20* (2013.01); *B30B 1/18* (2013.01); *G05D 1/0231* (2013.01); *G05D 1/0255* (2013.01); *G05D 1/0257* (2013.01); *G05D 1/0278* (2013.01); *G05D 1/0285* (2013.01); *B65F 2003/146* (2013.01); *B65F 2210/128* (2013.01); *B65F 2210/1443* (2013.01); *B65F 2210/162* (2013.01); *B65F 2210/184* (2013.01)

(58) Field of Classification Search
CPC ....... B30B 1/18; B30B 9/3096; B30B 9/3064; B30B 9/3046; B65F 2003/146; B65F 2210/128; B65F 2210/1443; B65F 2210/162; B65F 2210/184; B65F 1/1473; B65F 1/1405; B65F 3/20
USPC .................................................. 414/419, 425
See application file for complete search history.

(56) References Cited

U.S. PATENT DOCUMENTS

| | | |
|---|---|---|
| 7,000,532 B2 | 2/2006 | Imperato |
| 8,146,695 B1 | 4/2012 | Ramshur |
| 8,195,328 B2 | 6/2012 | Mallett |
| 8,438,695 B2 | 5/2013 | Gilbert, Jr. |
| 8,813,986 B2 | 8/2014 | Liscio |
| 9,493,303 B2 | 11/2016 | Wurman |
| 9,829,892 B1 | 11/2017 | Rodoni |
| 9,902,539 B2 | 2/2018 | Poss |
| 9,908,695 B1 | 3/2018 | Thompson |

(Continued)

*Primary Examiner* — Glenn F Myers
(74) *Attorney, Agent, or Firm* — Stephen Bullock; Bullock Law (57) ABSTRACT

Embodiments of the present invention are related to an autonomously propelled waste receptacle including a top, a collapsible lid, a housing, an exterior, an interior, and a bottom. The housing includes a circuit board panel, a door, and doorway. The exterior includes a user interface, a plurality of sensors, at least one antenna, and a camera. The interior includes a bin, a trash compactor with a plurality of threaded rods connected to the collapsible lid, an upper can platform, and a bottom tech platform. The bottom includes a plurality of wheels used to drive the autonomously propelled waste receptacle.
The collapsible lid also acts as a descending masher compacting trash within the interior bin and the bin is structured to rotate through the doorway to empty. The autonomously propelled waste receptacle may navigate using at least one of sensors, camera, WiFi communication, cellular communication, and GPS communication.

20 Claims, 9 Drawing Sheets

(56) References Cited

U.S. PATENT DOCUMENTS

| | | |
|---|---|---|
| 10,046,910 B2 | 8/2018 | Wagner |
| 10,071,893 B2 | 9/2018 | High |
| 10,120,389 B2 | 11/2018 | Rodoni |
| 10,152,737 B2 | 12/2018 | Lyman |
| 10,217,366 B2 | 2/2019 | Cronin |
| 10,286,558 B1 | 5/2019 | Asada |
| 10,301,110 B2 | 5/2019 | Parker |
| 10,343,102 B2 | 7/2019 | Reasoner |
| 10,481,607 B2 | 11/2019 | Domitras |
| 10,576,017 B2 | 3/2020 | Soucy |
| 2005/0281683 A1 | 12/2005 | Channel |
| 2007/0209846 A1 | 9/2007 | Wilson |
| 2008/0038102 A1 | 2/2008 | Murphy |
| 2008/0140253 A1 | 6/2008 | Brown |
| 2009/0008888 A1 | 1/2009 | Boulden |
| 2011/0056952 A1 | 3/2011 | Borowski |
| 2011/0153063 A1 | 6/2011 | Worman |
| 2011/0220646 A1 | 9/2011 | Yang |
| 2014/0090201 A1 | 4/2014 | Gilbert, Jr. |
| 2014/0097280 A1 | 4/2014 | Perez Santafe |
| 2014/0214697 A1 | 7/2014 | McSweeney |
| 2016/0272419 A1* | 9/2016 | Jenkins ................ B65F 1/1405 |
| 2016/0379468 A1 | 12/2016 | Wu |
| 2018/0016096 A1 | 1/2018 | Krishnamurthy |
| 2018/0035606 A1 | 2/2018 | Burdoucci |
| 2018/0057259 A1 | 3/2018 | Chan |
| 2018/0110893 A1 | 4/2018 | Chang |
| 2019/0121358 A1 | 4/2019 | Bussetti |
| 2019/0196475 A1 | 6/2019 | Vandewall |
| 2019/0352090 A1 | 11/2019 | Mallady |
| 2019/0375177 A1 | 12/2019 | Basso |
| 2019/0382197 A1 | 12/2019 | Li |
| 2019/0382200 A1* | 12/2019 | Lee ....................... G01F 23/284 |
| 2020/0062354 A1 | 3/2020 | Kurani |
| 2020/0171759 A1 | 6/2020 | Leggett |
| 2022/0051502 A1* | 2/2022 | Schwartz ............. H04W 12/08 |

* cited by examiner

AUTONOMOUSLY PROPELLED WASTE RECEPTACLE AND ASSOCIATED METHODS

FIELD OF THE INVENTION

The present invention relates to systems and methods for collecting and transporting waste. More particularly, the present invention relates to an autonomously propelled waste receptacle.

BACKGROUND

In early 2020, the world was plagued by the coronavirus pandemic causing widespread COVID-19 illness and loss of human life. As a result, the U.S. economy sharply declined and for a period of time most economic and social activity was halted. It has been determined that the coronavirus, like many other harmful microorganisms, is spread by humans being in close proximity to each other and by the sharing of common facilities such as traditional trash cans. However, the universal use and systemic coordination of common facilities is a cornerstone of modern society.

There exists a need in the art for a waste disposal system that promotes social distancing and the sanitized removal of refuse. Moreover, there exists a need for an autonomously propelled waste receptacle and associated methods.

This background is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to an autonomously propelled waste receptacle including a top, a collapsible lid, a housing, an exterior, an interior, and a bottom. The housing may include a circuit board panel, a door, and doorway. The exterior may include a user interface, a plurality of sensors, at least one antenna, and a camera. The interior may include a bin, a trash compactor with threaded rods connected to the collapsible lid, an upper can platform, and a bottom tech platform. The bottom may include a pair of motorized wheels, and a pair of unmotorized wheels.

In this embodiment, a portion of the collapsible lid may be structured to rotate into a downward orientation, defined as an open position. The collapsible lid may also be structured as a masher operable to descend the interior of the autonomously propelled waste receptacle via the threaded rods and compact trash within the bin.

The user interface may be structured as an override to automated features of the autonomously propelled waste receptacle and the plurality of sensors may include at least one of lidar sensors, ultrasonic sensors, and radar. Additionally, the camera may be structured to assist with navigation and object identification.

The bin may be structured to rotate from a vertical position, defined as a receiving position, to an angled position defined as an emptying position. Moreover, the door may be structured to rotate into an open orientation allowing the bin to pass through the doorway when the bin is converting to an emptying position.

The autonomously propelled waste receptacle may be structured to navigate using at least one of the plurality of sensors, camera, WiFi communication, cellular communication, and global positioning system (GPS) communication. Additionally, the at least one antenna may be structured to send and receive at least one of cellular signals, WiFi signals, and GPS signals and data. Furthermore, the autonomously propelled waste receptacle may be structured to use the motorized wheels and unmotorized wheels to drive.

In this embodiment, the collapsible lid may include a backstop structured to secure the collapsible lid in a closed position when being used as a masher. Additionally, a plurality of L-shaped arms may connect to the collapsible lid and the plurality of threaded rods. The L-shaped arms may be structured to extend the collapsible lid into the bin when the collapsible lid is acting as a masher. Furthermore, the L-shaped arms may include a lateral portion connected to a respective threaded rod and a longitudinal portion connected to the collapsible lid. The masher may be structured to descend into the bin by a length equal to the longitudinal portion of the L-shaped arms.

Each motorized wheel and unmotorized wheel may include a plurality of wheel subsets configured to facilitate maneuvering the autonomously propelled waste receptacle in multiple directions.

The upper can platform may be oriented above the bottom tech platform by a plurality of risers extending from the bottom tech platform to the upper can platform. Furthermore, the upper can platform may include a scale structured to weigh refuse deposited in the autonomously propelled waste receptacle.

Some embodiments may include a top opening and a top underside including a plurality of top Light Emitting Diodes (LEDs) affixed thereon. The top may include an upper ridge with a disinfectant spray actuator. Additionally, the collapsible lid may include a lid axle, a static panel, a downward rotating panel, and a backstop.

The housing may include a printed circuit board (PCB) and an activity processor affixed on the circuit board panel. Furthermore, the exterior may include a plurality of LEDs circumscribing an upper portion and a plurality of LEDs circumscribing a lower portion. The interior may include a bottom tech platform including a plurality of bottom motors, a motor processor, and an upper chamber positioned between the collapsible lid and the top. The upper chamber may include at least one chamber sensor and at least one chamber motor.

The chamber sensor may be structured to recognize when an object has entered the upper chamber so as to signal the motor processor to actuate the chamber motor and pivot the downward rotating panel into an open position. The motor processor may be structured to signal the top LEDs and the disinfectant actuator to initialize for a period of time when the collapsible lid has returned to a closed position.

The bin may be structured to rotate along a bin axle. The bin axle may be structured to rotate by a sprocket-wheel and chain operable by a motor on the upper can platform. Furthermore, the bin may include one curved longitudinal surface and a plurality of uncurved longitudinal surfaces.

The autonomously propelled waste receptacle may include a plurality of support pillars that run the longitudinal length of the interior extending from the upper can platform to the top. The threaded rods and their respective motors may be located between at least two pairs of support pillars.

The autonomously propelled waste receptacle may include motorized wheels with a plurality of wheel subsets structured to facilitate maneuvering the autonomously propelled waste receptacle in multiple directions.

The camera may be structured to record obstacles in the driving path of the autonomously propelled waste receptacle and relay the recording to the motor processor. The motor processor may be structured to recognize the obstacles and signal the motorized wheels to maneuver around the obstacles. Furthermore, at least one of the lidar sensors, ultrasonic sensors, and radar may be structured to detect obstacles in the driving path of the autonomously propelled waste receptacle and relay that data to the motor processor. The motor processor may be structured to recognize the data and signal the motorized wheels to maneuver around the obstacles.

The autonomously propelled waste receptacle may include a top with a motorized pivot system structured to rotate the top into an angled position. A plurality of top LEDs may be structured to emit at least one of ultraviolet light with wavelengths between the range of 10-400 nanometers and visible light with wavelengths between the range of 400-700 nanometers. Furthermore, the activity processor may be structured to orient the autonomously propelled waste receptacle within a geographic area using information from at least one of cellular signals, WiFi signals, and GPS signals and data. Additionally, the lower tech platform may include a plurality of wheel apertures structured to accommodate wheels therethrough.

The top may be structured to rotate into an angled position and the top underside LEDs may be structured to activate as headlights in a driving direction. Furthermore, the plurality of lights circumscribing the upper portion and plurality of lights circumscribing the lower portion of the exterior may be structured to illuminate in a semicircle in the direction the autonomously propelled waste receptacle is moving. Moreover, at least a portion of the plurality of lights circumscribing the upper portion and plurality of lights circumscribing the lower portion may be structured to illuminate green when the autonomously propelled waste receptacle is moving, red when stopped, and flashing yellow when compacting.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context with the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
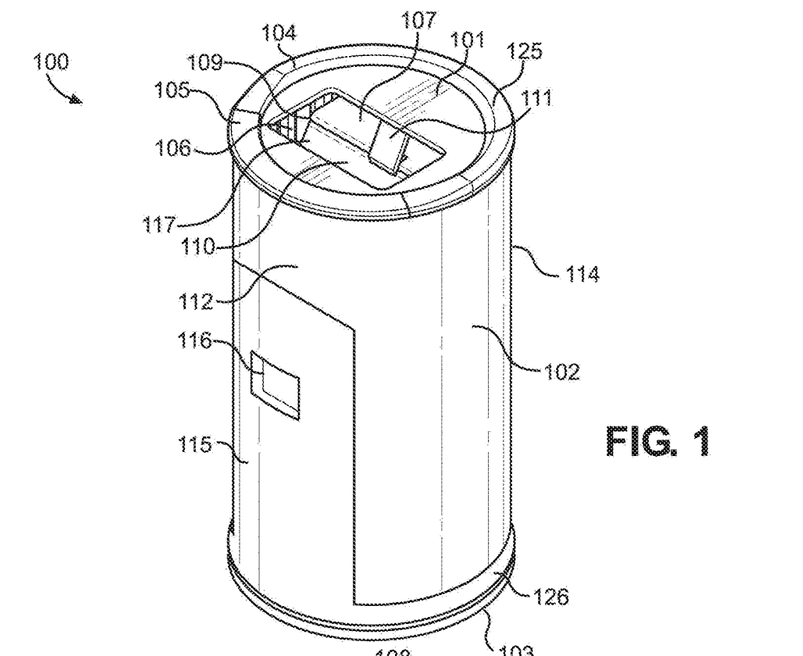
FIG. 1 is a front perspective view of an autonomously propelled waste receptacle according to an embodiment of the invention.

Referring to FIG. 1, an autonomously propelled waste receptacle, hereinafter the apparatus 100, will be described in more detail. The apparatus 100 may be cylindrical in shape and may include a top 101, a housing 102 including a front portion 112 and rear portion 114, and a bottom 103. The interior of the housing 102 may be lined with reflective material capable of redirecting light throughout.

Within the exterior front portion 112 of the housing 102 may be a front plate 115. The front plate 115 may be a removably attached section of the housing 102 that may protect electrical componentry therein. In some embodiments, the front plate 115 may include a lower segment 126 that circumscribes the bottom 103 thereby protecting electrical componentry proximate the bottom 103. The front plate 115 of the housing 102 may also include a user interface 116, which may function as a user-controlled override to automated features of the apparatus 100. The user interface 116 may indicate the status of the apparatus 100 such as whether it is full, active, inactive, in transit, or being accessed without permission.

The top 101 may be disk shaped and may be circumscribed by a ridge 125 consisting of a semicircular upper ridge 104 and a semicircular lower ridge 105. Within the top 101 toward the front portion 112 of the apparatus 100 may be a top opening 106. In some embodiments the top opening 106 may be a rectangular shaped aperture structured to receive waste material therethrough. However, one skilled in the art will appreciate that the top opening 106 may be circular, square, oval, polygonal, or the like.

Just below the top opening 106, within an interior of the apparatus 100 may be a collapsible lid 107. The collapsible lid 107 may include a static panel 108, a lid-divide 109, a downward rotating panel 110, and a backstop 111. The collapsible lid 107 may be bifurcated by the lid-divide 109, which may separate the collapsible lid 107 into the static panel 108 and the downward rotating panel 110.

The backstop 111 may be an elongate piece connected to the downward rotating panel 110 that extends across the lid-divide 109 and overtop the static panel 108. Therefore, the backstop 111 may be structured to allow for the downward rotating panel 111 to rotate downward toward the interior of the apparatus 100. However, the positioning of the backstop 111 overtop the static panel 108 may prevent the downward rotating panel 110 from rotating in the opposite direction. As shown by FIG. 1, the downward rotating panel 110 is rotated downward orienting the collapsible lid 107 in an open position 117. In the open position 117 the backstop 111 may be parallel with respect to the downward rotating panel 110, but angled with respect to the static panel 108.

Figure 2:
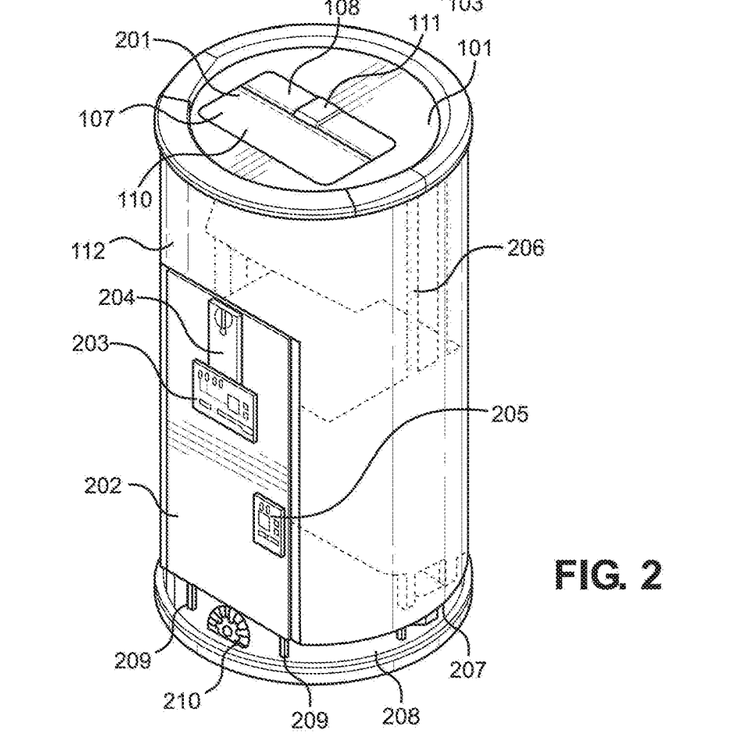
FIG. 2 is a front perspective view of the autonomously propelled waste receptacle in FIG. 1 showing interior componentry according to an embodiment of the invention.

FIG. 2 illustrates the collapsible lid 107 in a closed position 201. As shown, the backstop 111 is parallel to the downward rotating panel 110 and the static panel 108. Both the downward rotating panel 110 and the static panel 108 may be aligned at a 180-degree angle when in the closed position 201. Furthermore, the positioning and structure of the backstop 111 may bias the collapsible lid 107 in a closed position 201. The collapsible lid 107 may remain in the closed position 201 until an external force is applied to the downward rotating panel 110 such as that from human user or a motorized system.

Also shown in this figure is the front portion 112 of the housing with front plate 115 removed. Behind the front plate 115 may be a circuit board panel 202 structured to accommodate a printed circuit board (PCB) 203, an activity processor 204, and other electrical componentry 205 thereon. The activity processor 204 may manage the commands delivered from the user interface 116 and may coordinate navigation of the apparatus 100, interaction with other autonomously propelled waste receptacles 100, and communication with a network.

With the front plate 115 removed, a lower tech platform 208 may be exposed showing the apparatus wheels 210 protruding therethrough. Also shown may be risers 209 on the lower tech platform 208 structured to separate an upper can platform 207 and internal can componentry 206 from electronical componentry hosted on the lower tech platform 208.

Figure 3A:
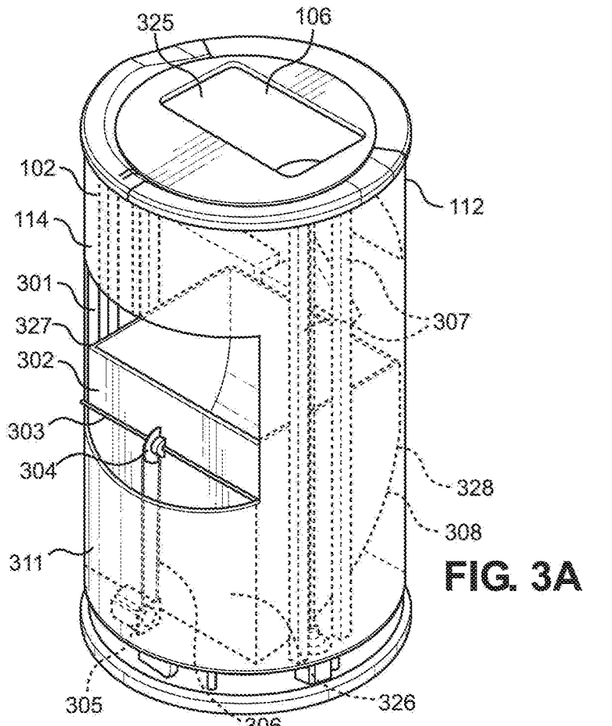
FIG. 3A is a rear perspective view of the autonomously propelled waste receptacle in FIG. 1 illustrated with interior componentry according to an embodiment of the invention.

FIG. 3A is a rear perspective view of the apparatus 100 highlighting some internal componentry such as a plurality of support pillars 307 and an internal waste storage and removal system. Two opposing pairs of support pillars 307 may extend from the upper can platform 207 to the top 101 and may provide structured support to the apparatus 100. These support pillars 307 may be positioned on side portions of the apparatus 100 between the front portion 112 and rear portion 114 of the housing 102.

Within the rear portion 114 of the housing 102 may be a doorway 301. The doorway 301 may be a rectangular aperture sized to accommodate an internal bin 302 to pass therethrough. The bin 301 may be an internal container structured to have at least one curved longitudinal surface 308 and a plurality of uncurved longitudinal surfaces 311. These surfaces 308, 311 may connect together to form a square or rectangular bin top 327, a sliding bin shoot 328 proximate the front portion 112, and a flat bin back 326 proximate the rear portion 114.

The bin 301 may be rotated via a bin axle 303 extending across the flat bin back 326 in combination with at least one sprocket-wheel 304 medially located thereon. The sprocket-wheel 304 and as a result, the bin axle 303 may be rotated by a chain 306 linked around the sprocket-wheel 304 and actuated by a bin motor 305 positioned on the lower tech platform 208.

The arcuate structure of the curved longitudinal surface 308 and resulting sliding bin shoot 328 may allow for the bin 301 to rotate within the cylindrical confines of the interior 325 of the apparatus 100 without being obstructed by the housing 102 walls of the front portion 112. Furthermore, the arcuate structure of the curved longitudinal surface 308 and sliding bin shoot 328 may allow for waste to spread more evenly throughout the interior of the bin 301 since gravity may distribute compiled waste from the curved front portion 112 of the bin 301 toward the flat bin back 326. This is because waste may enter the apparatus 100 through the top opening 106, which is located proximate the front portion 112 and aligned with a top edge of the curved longitudinal surface 308.

Figure 3B:
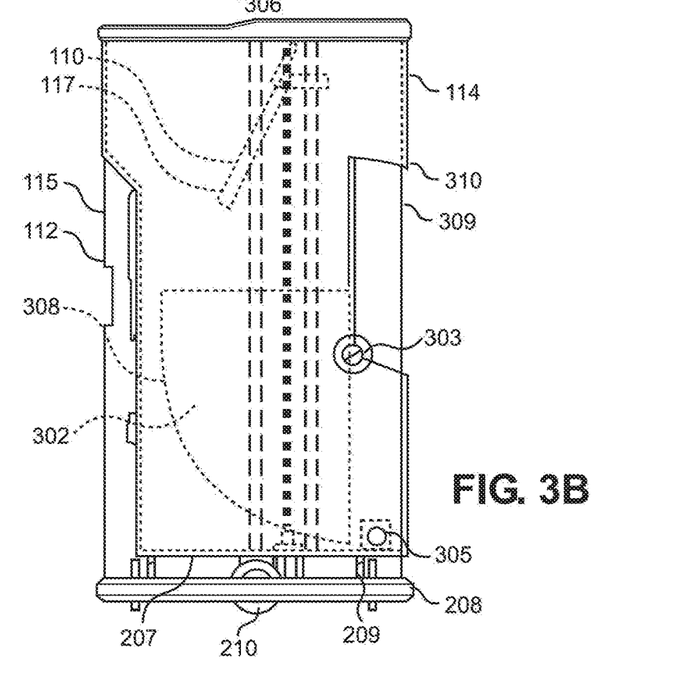
FIG. 3B is a side view of the autonomously propelled waste receptacle in FIG. 1 illustrated with interior componentry according to an embodiment of the invention.

FIG. 3B illustrates the alignment between where waste may enter the top 101 and be collected by the bin 302. As shown, the downward rotating panel 110 is angled placing the collapsible lid 107 in the open position 117. The angle of the downward rotating panel 110 may direct entering waste toward the bin shoot 328, which may then use gravity to redistribute the waste within the bin 302.

The internal waste storage and removal system may also include a door 309 on the rear portion 114 of the housing 102. The door 309 may cover the doorway 301 to encapsulate the bin 302 and its waste within the confines of the interior 325. However, the door 309 may be rotatable along a hinge 310 on an upper portion of the doorway 301. The hinge 310 may allow for the door 309 to open toward the outside of the apparatus 100 allowing the bin 302 to rotate along the bin axle 303 and pass through the doorway 301 when emptying its contents.

This figure also shows the upper can platform 207 being separated from the lower tech platform 208 by the risers 209. The upper can platform 207 may support the internal waste storage and removal system while keeping the waste and the weight away from electrical components on the lower tech platform 208. Furthermore, as a means to regulate the integrity of the system, a base of the upper can platform 207 may act as a scale to assist the apparatus 100 with determining if the weight of its contents requires it to take an action. Such an action may include emptying the bin 302 or returning to a docking station. In other embodiments, the risers 209 may act as scale sensors to measure the weight of the bin 302 to determine if an action should be taken.

Figure 4A:
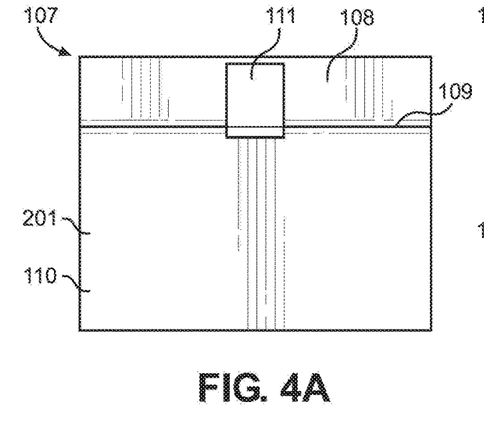
FIG. 4A is a top view of a collapsible lid of the autonomously propelled waste receptacle depicted in a closed position according to an embodiment of the invention.
Figure 4B:
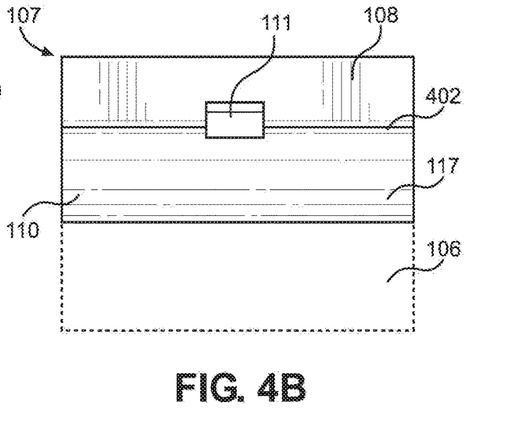
FIG. 4B is a top view of the collapsible lid in FIG. 4A in an open position according to an embodiment of the invention.

FIGS. 4A and 4B demonstrate the collapsible lid 107 in a closed position 201 and open position 117 respectively. In a closed position 201 the static panel 108 and downward rotating panel 110 are aligned at a 180-degree angle and the backstop 111 is overlapping them both to prevent the collapsible lid 107 from prolapsing backward. When in the open position 117, the collapsible lid 107 may allow for waste material to pass through the top opening 106 and into the apparatus 100.

Figure 4C:
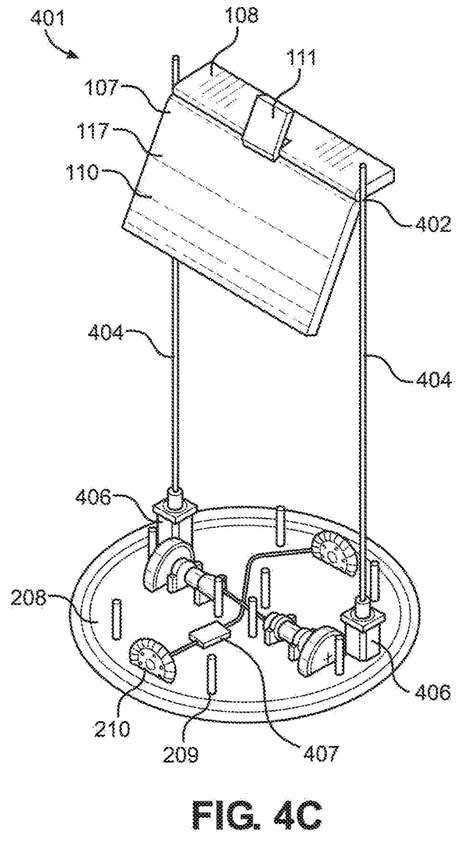
FIG. 4C is a side perspective view of the collapsible lid in FIG. 4A as connected to internal componentry according to an embodiment of the invention.
Figure 4D:
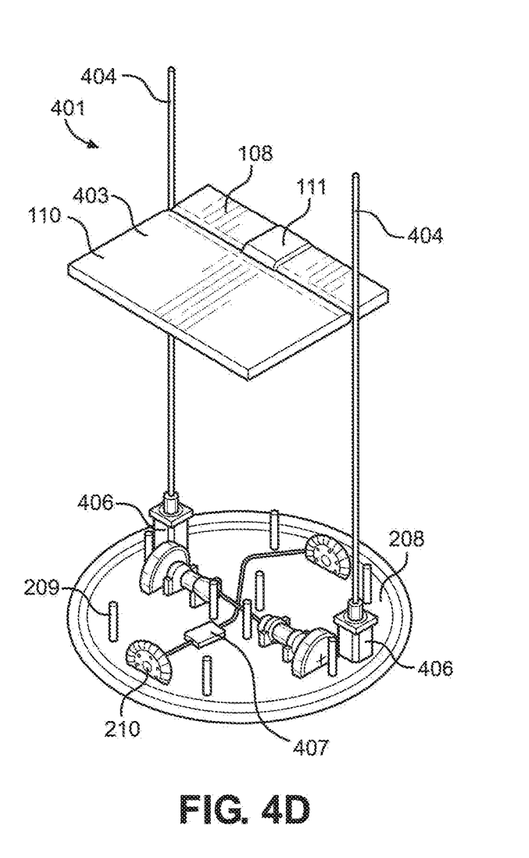
FIG. 4D is a side perspective view of the collapsible lid in FIG. 4B as connected to internal componentry according to an embodiment of the invention.

FIGS. 4C and 4D illustrate how the open position 117 and the closed position 201 of the collapsible lid 107 function together with coordinated effort to allow the collapsible lid 107 to be repurposed as a masher 403 after it has functioned as a containment lid.

The collapsible lid 107 may be connected to threaded rods 404 on opposing sides. A lid axle 402 may allow for the collapsible lid 107 to rotate into an open position 117 when it is acting as a lid. This may occur when the collapsible lid 107 is located at an upper region of the threaded rods 404. When returned to the closed position 201, the collapsible lid 107 may convert into a masher 403 structured to compact waste material within the bin 302.

The masher 403 may descend the apparatus 100 interior 325 by means of the threaded rods 404 being actuated by rod motors 406 at their base on the lower tech platform 208. The backstop 111 may offer rigidity to the masher 403 when compacting waste so that the 180-degree positioning of the downward rotating panel 110 is not compromised and leverage is able to be applied to the masher 403 when compacting.

Because the masher 403 is attached to the threaded rods 404 by an attachment component that itself is threaded, when the threaded rods 404 are rotated in conjunction with each other, the masher 403 may descend when compacting trash. Likewise, when the threaded rods 404 are rotated in an opposite direction, the masher 403 may ascend when returning to function as the collapsible lid 107.

The operability of the trash compactor system 401 may be controlled and coordinated by a motor processor 407 located on the lower tech platform 208. This motor processor 407 may be tasked with regulating when and how the masher 403 may descend and ascend. It may also coordinate when and how the wheels 210 are to rotate.

Figure 5A:
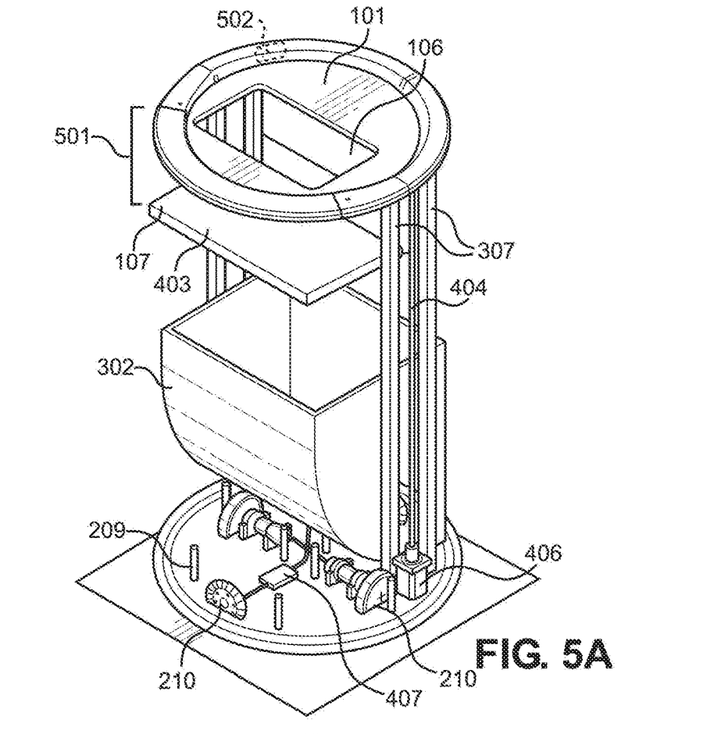
FIG. 5A is a front perspective view of the internal compacting system of the autonomously propelled waste receptacle according to an embodiment of the invention.
Figure 5B:
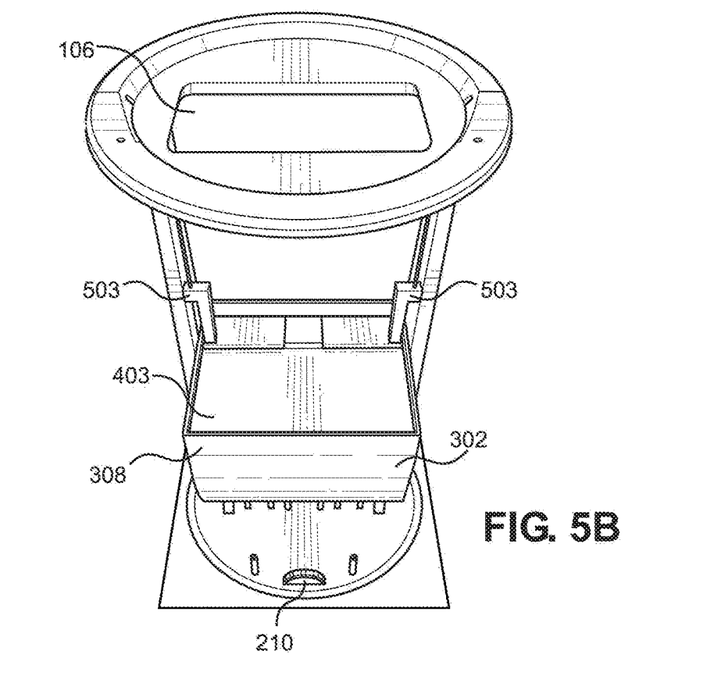
FIG. 5B is a top front perspective view of the internal compacting system of the autonomously propelled waste receptacle according to an embodiment of the invention.
Figure 5C:
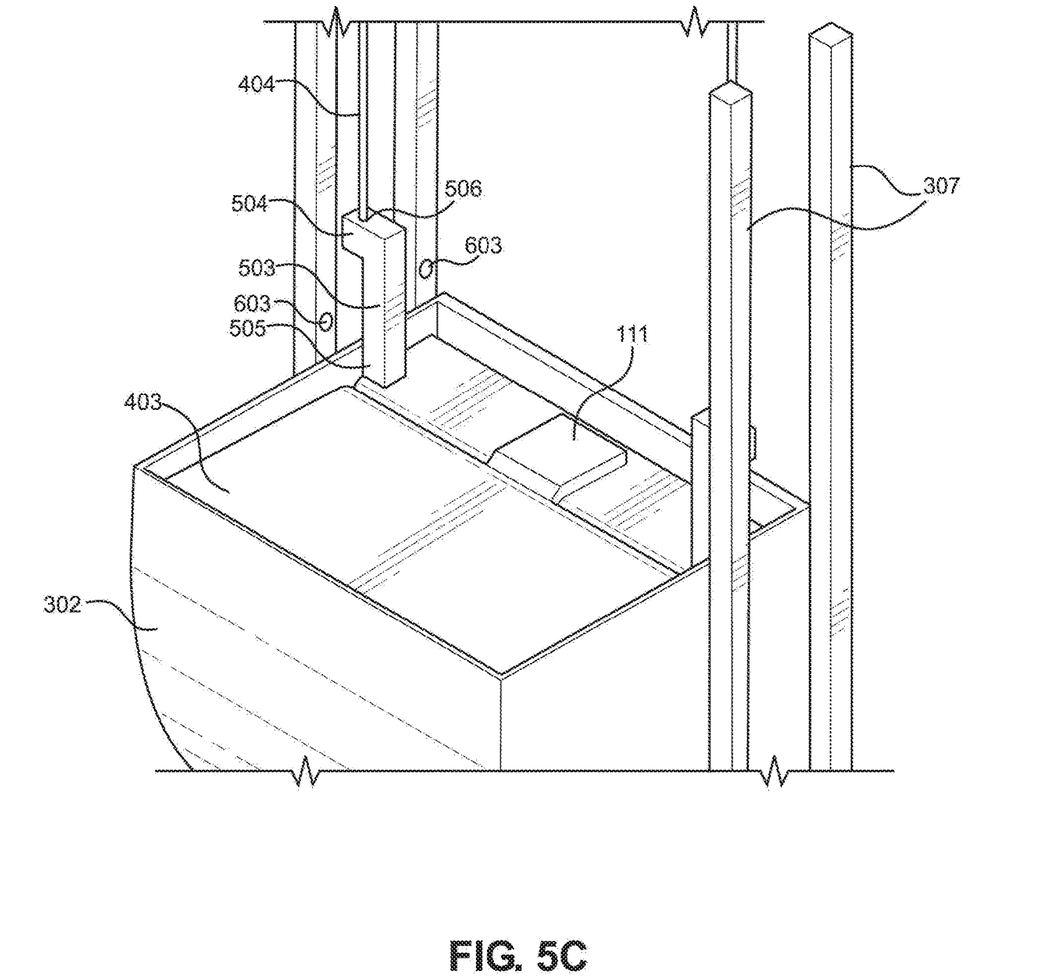
FIG. 5C is a segmented perspective view of an internal bin in the compacting position according to an embodiment of the invention.

FIGS. 5A through 5C illustrate in more detail the trash compactor system 401 and disinfectant features of the apparatus 100. As shown by FIG. 5A, the ridge 125 may include a disinfectant spray actuator 502 therein. The disinfectant actuator 502 may be controlled by one or both of the motor processor 407 and the activity processor 204 as to how and when disinfectant spray may be administered to an upper chamber 501 of the apparatus 100. The upper chamber 501 may be formed by the space between the top 101 and the collapsible lid 107 in the closed position 201. Disinfectant spray may be administered for a period of time when the masher 403 is acting as the collapsible lid 107 to the apparatus 100. Although the disinfectant actuator 502 is depicted as a small container within the upper ridge 104, in some embodiments, it may be a tube dimensioned to fit within the entire upper ridge 104 and angled to administer disinfectant spray to the entire upper chamber 501. In other embodiments, the tube may be structured to mirror the geometric interior of the upper ridge 104 to maximize the amount of disinfectant spray able to be transported within the apparatus 100.

The ridge 125 and structure of the apparatus 100 may be stabilized by support pillars 307 on either side of the bin 302. In some embodiments, there may be two opposing pairs of support pillars 307. In this embodiment, the threaded rods 404 and their respective rod motors 406 may be positioned between each pair of support pillars 307.

FIGS. 5B and 5C illustrate the collapsible lid 107 acting as a masher 403 and descending into the bin 302 to compact trash therein. Both figures show that the masher 403 may be connected to L-shaped arms 503 on either side. The L-shaped arms 503 may also be connected to respective threaded rods 404 and may be structured to extend the masher 403 into the bin 302. The L-shaped arms 503 may include a lateral portion 504 connected to a respective threaded rod 404 and a longitudinal portion 505 connected to the masher 403. The lateral portion 504 may include threaded apertures 506 designed to accommodate the threaded rods 404 therethrough. These threaded apertures 506 may coordinate with the threading of the threaded rods 404 to enable the masher 403 to ascend and descend the apparatus 100. When compacting trash within the bin 302, the masher 403 may descend into the bin 302 by a length equivalent to the length of the longitudinal portion 505 of the L-shaped arms 503.

Figure 6A:
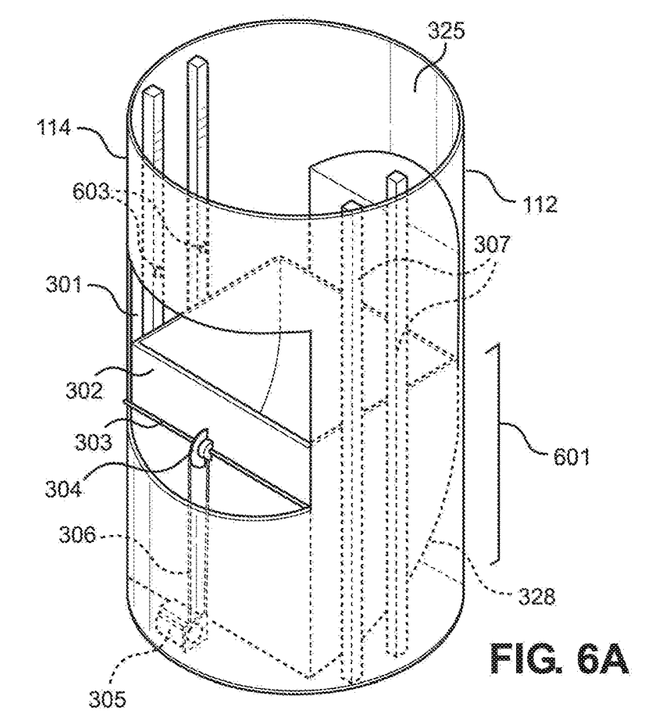
FIG. 6A is a rear environmental view of the bin in a receiving position according to an embodiment of the invention.
Figure 6B:
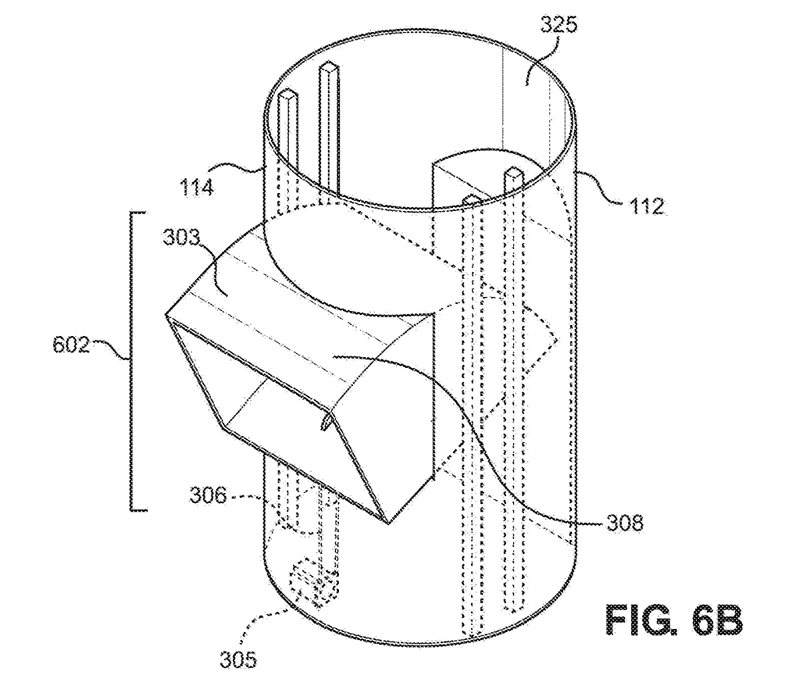
FIG. 6B is a rear environmental view of the bin in an emptying position according to an embodiment of the invention.

FIGS. 6A and 6B demonstrate the collection and emptying features of the bin 302 within the apparatus 100. In FIG. 6A, the bin 302 is oriented in a vertical position, defined as a receiving position 601, so that the bin top 327 is aligned and facing the top opening 106. This may allow for waste material to enter the top opening 106 and slide into the bin 302 along the bin shoot 328. Limit sensors 603 within the support pillars 307 proximate the bin top 327 may indicate to the activity processor 204 the fullness level of the bin 302 and signal when it is time for the apparatus 100 to take action such as emptying the bin 302, return to or dispatch from a docking station. In some embodiments, the limit sensors 603 may work in conjunction with the scale and scale sensors to signal the activity processor 204 to determine an appropriate action based on the waste status of the bin 302. This action may include when to compact the bin 302, when to empty the bin 302, or when to return the apparatus 100 to a docking station.

By way of non-limiting examples, if the limit sensor 603 determines that the waste is at a threshold level, but the weight sensor determines that the waste material within the bin 302 is light, the activity processor 204 may signal the masher 403 to compact the bin 302. If the limit sensor 603 determines that the waste is at a threshold level and the weight sensor determines that the waste material is heavy, the activity processor 204 may signal the motor processor 407 to navigate the apparatus 100 either back to a docking station or to an emptying station depending on the location of the apparatus 100 at the time of determination.

FIG. 6B demonstrates that once the activity processor 204 determines that the bin 302 has reached its capacity of waste, it may signal the motor processor 407 to actuate the bin motor 305. The bin motor 305 may then rotate the chain 306, which may turn the sprocket-wheel and bin axle 303. This may in turn rotate the bin 302 from a vertical receiving position 601 to an angled emptying position 602. When rotating, the bin 302 may apply force to the door 309 rotating it along its hinge 310 into an open position and allowing the bin 302 to pass through the doorway 301 to achieve the emptying position 602.

Figure 7A:
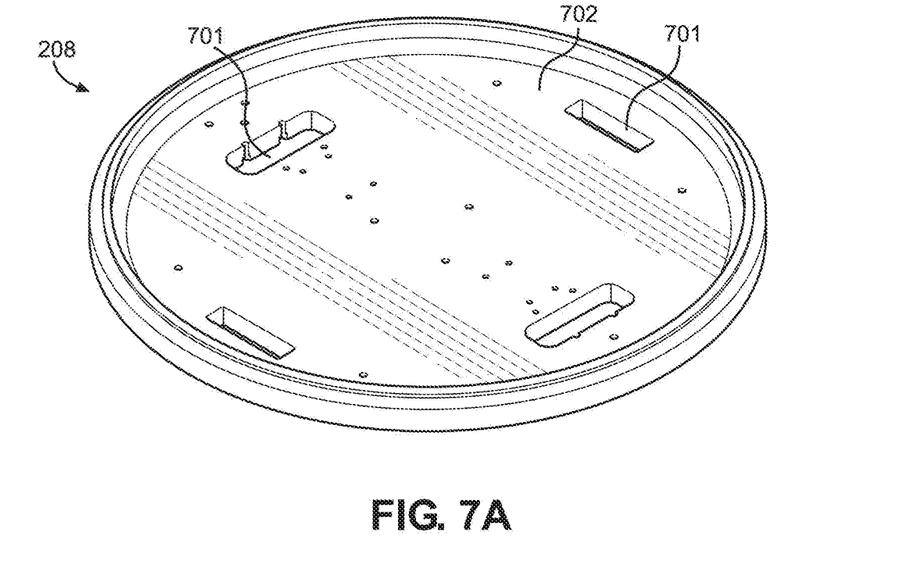
FIG. 7A is a top perspective view of a platform used within the autonomously propelled waste receptacle according to an embodiment of the invention.
Figure 7B:
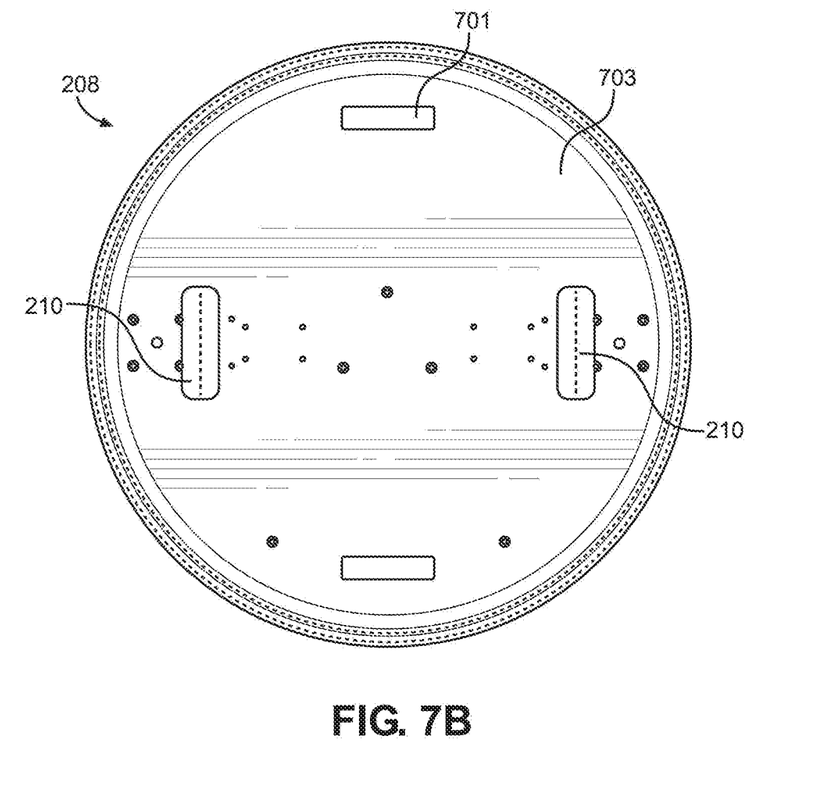
FIG. 7B is a bottom view of a platform used within the autonomously propelled waste receptacle according to an embodiment of the invention.

FIGS. 7A and 7B illustrate the lower tech platform 208 from a top and bottom view. FIG. 7A shows that the lower tech platform 208 may include a plurality of wheel apertures 701 structured to accommodate at least a portion of a plurality of wheels 210 therethrough. In some embodiments, the wheel apertures 701 may be located toward the front portion 112 and the rear portion 114 of the lower tech platform 208. Furthermore, there may be wheel apertures 701 on opposing sides of the lower tech platform 208. The inside surface 702 of the lower tech platform 208 may be the supporting surface for most of the electronic and mechanical components proximate the bottom 103 in addition to the risers 209.

FIG. 7B illustrates the bottom surface 703 of the lower tech platform 208, which also may be the underside of the apparatus 100. In this figure, wheels 210 are positioned through the wheel apertures 701 on either side of the tech platform 208. The wheel apertures 701 on the front portion 112 and rear portion 114 are shown without wheels 210 therethrough.

Figure 8A:
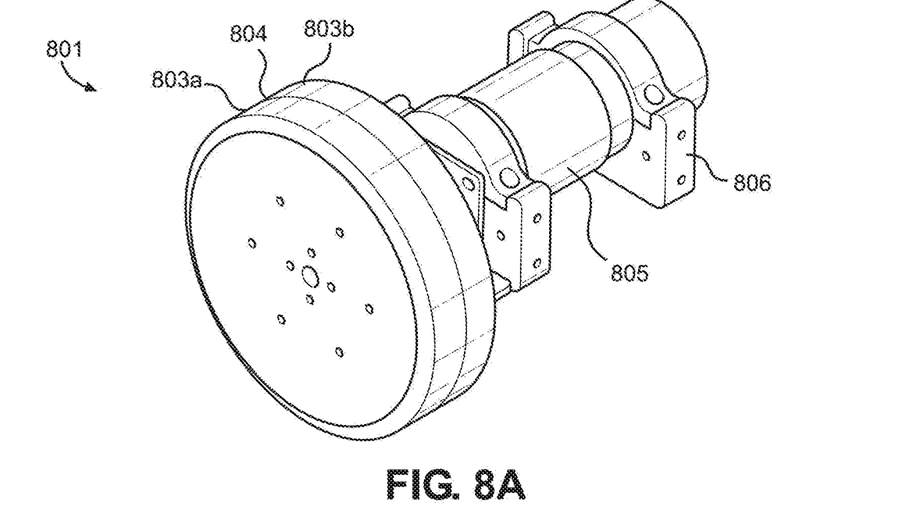
FIG. 8A is side perspective view of a wheel component of the autonomously propelled waste receptacle according to an embodiment of the invention.
Figure 8B:
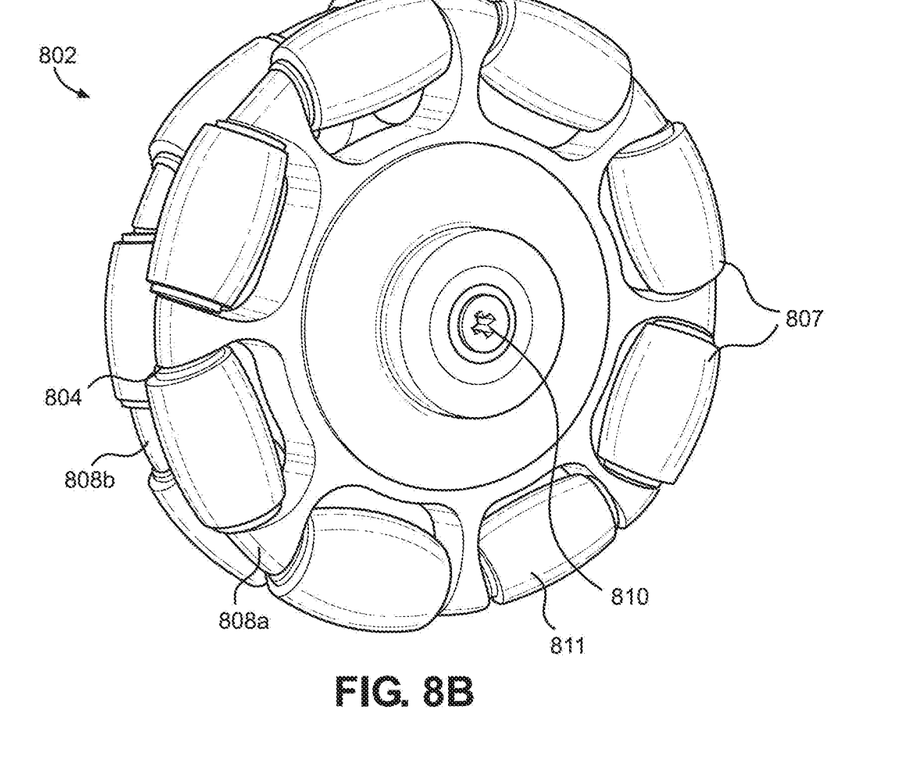
FIG. 8B is a side perspective view of a wheel component of the autonomously propelled waste receptacle according to an embodiment of the invention.

FIGS. 8A and 8B illustrate the different wheels 210 that may be used to drive and steer the apparatus 100. FIG. 8A shows a motorized wheel 801 that may include an outer wheel hemisphere 803a and an inner wheel hemisphere 803b separated by a bifurcating midsection 804. Both the outer wheel hemisphere 803a and inner wheel hemisphere 803b may work in conjunction to rotate the motorized wheel 801. Also connected to the motorized wheel 801 may be a wheel motor 805 supported by a brace 806.

The wheel motor 805 may be used to rotate the motorized wheel 801 as needed. In some embodiments, the wheel motor 805 may be structured to rotate the outer wheel hemisphere 803a differently than the inner wheel hemisphere 803b. By way of non-limiting example, the outer wheel hemisphere 803a may be rotated at a faster speed than the inner wheel hemisphere 803 and vice versa to assist with steering the apparatus 100. In other embodiments, both wheel hemispheres 803a, 803b may be connected and rotated at the same speed and in unison as a single unit.

FIG. 8B shows a multidirectional wheel 802 that may include an inside wheel hemisphere 808a and an outside wheel hemisphere 808b separated by a bifurcating midsection 804 and rotated along a wheel axle 810. Similar to the motorized wheel 801 of FIG. 8A, the multidirectional wheel 802 hemispheres 808a, 808b may be structured to rotate differently. By way of non-limiting example, the outside wheel hemisphere 808a may be rotated at a faster speed than the inside wheel hemisphere 808b and vice versa to assist with steering the apparatus 100. In other embodiments, both wheel hemispheres 803a, 803b may be connected and rotated at the same speed in unison.

The multidirectional wheel 802 may include a plurality of wheel subsets 807. The wheel subsets 807 may be smaller individual wheels 811 structured to rotate in a direction perpendicular to the larger wheel hemispheres 808a, 808b. By way of non-limiting example, each wheel hemisphere 808a, 808b may include eight smaller individual wheels 811. However, in other embodiments there may be a greater number of smaller individual wheels 811 and in other embodiments there may be less.

In some embodiments, the multidirectional wheels 802 may be motorized and in other embodiments they may not be motorized. In embodiments where the multidirectional wheels 802 are motorized, the motor processor 407 may direct the rotation and speed of the wheel hemispheres 808a, 808b as well as the speed of the smaller individual wheels 811. Motorized rotation of the wheel hemispheres 808a, 808b and the smaller individual wheels 811 may facilitate steering the apparatus 100. Furthermore, the smaller individual wheels 811 may allow for the apparatus 100 to turn more quickly with more agility and stability than other wheel alternatives.

In some embodiments, the apparatus 100 may utilize a pair of motorized wheels 801 and a pair of unmotorized multidirectional wheels 802. In this embodiment, the motorized wheels 801 may use a differential drive system and be located on either side of the apparatus 100. The unmotorized multidirectional wheels 802 may be located proximate the front portion 112 and rear portion 114 of the apparatus 100.

In other embodiments, the apparatus 100 may utilize only multidirectional wheels 802 that are motorized. In this embodiment, the apparatus 100 would be propelled and steered by the speed of each wheel hemisphere 808a, 808b and their respective smaller individual wheel 811.

In still other embodiments, the apparatus 100 may be propelled by motorized wheels 801, unmotorized multidirectional wheels 802, non-motorized caster wheels, or a combination thereof. In some embodiments the apparatus 100 may include only a pair of differential drive motorized wheels 801 on either side of the apparatus 100 and a pair of unmotorized caster wheels at the front portion 112 and rear portion 114 of the apparatus.

Figure 9:
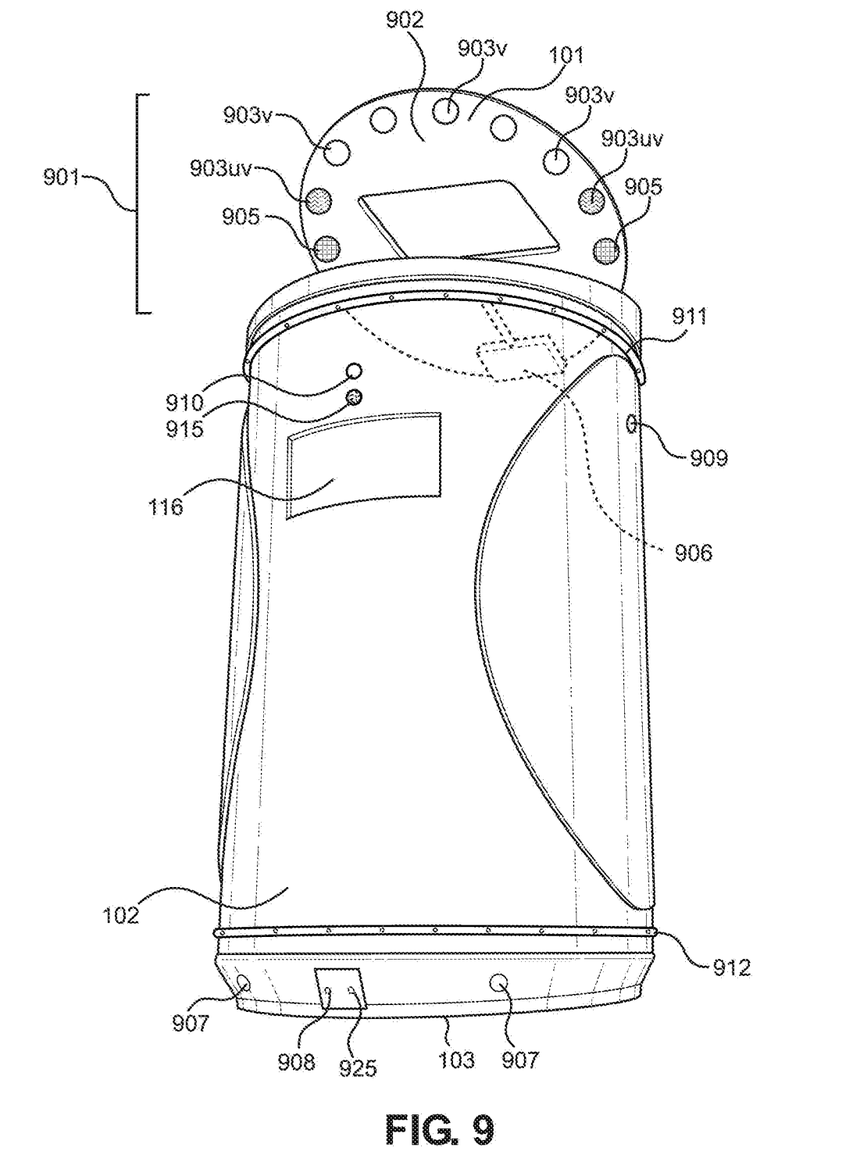
FIG. 9 is a side perspective view of an embodiment of the autonomously propelled waste receptacle.

Referring now to FIG. 9, an embodiment of the apparatus 100 may include a top 101 that may be rotatable via motorized pivot system utilizing a chamber motor 906. This may place the top 101 into an angled position 901 to expose a top underside 902. The top underside 902 may include a plurality of top light emitting diodes (LEDs) 903 positioned proximate the top underside 902 circumference. In some embodiments, there may be one or more ultraviolet LEDs 903uv capable of emitting ultraviolet light with wavelengths between the range of 10-400 nanometers. There may also be one or more visible light LEDs 903v emitting light with wavelengths between the range of 400-700 nanometers. In some embodiments, the top 101 may be structured to rotate into an angled position 901 and may activate the plurality of LEDs 903v on the top underside 902 to utilize them as headlights in a driving direction. Furthermore, the motor processor 407 may be structured to signal the top ultraviolet LEDs 903uv to activate and sanitize the upper chamber 501.

Also located on the top underside 902 may be one or more chamber sensors 905 structured to recognize when an object has entered the upper chamber 501. This may signal the motor processor 407 to actuate the chamber motor 906 and pivot the downward rotating panel 110 into an open position 117. The chamber sensor 905 may also signal one or both of the activity processor 204 and motor processor 407 when an action is needed such as sanitizing the upper chamber 501 via the disinfectant spray actuator 502, emitting ultraviolet light via the ultraviolet LEDS 903uv, or both. By way of non-limiting example, once the collapsible lid 107 has returned to a closed position 201, the motor processor 407 may actuate sanitization of the upper chamber 501 after a predetermined period of time.

Just below the top 101 and circumscribing the exterior of the housing 102 may be upper housing LEDs 911. Likewise, circumscribing an exterior lower portion of the housing 102 may be lower housing LEDs 912. In some embodiments, the plurality of upper housing LEDs 911 and plurality of lower housing LEDs 912 may be structured to illuminate in a semicircle in the direction the apparatus 100 is moving. Additionally, at least a portion of the plurality of upper housing LEDs 911 and at least a portion and plurality of lower housing LEDs 912 may be structured to illuminate green when the apparatus 100 is moving, red when stopped, and flashing yellow when compacting.

The housing 102 may also include a camera 910, lidar sensors 907, ultrasonic sensors 908, and radar 925 on its exterior. Furthermore, the activity processor 204 may utilize WiFi communication, cellular communication, and global positioning system (GPS) communication sent and received from at least one antenna 909 on the housing 102 to assist with navigating the apparatus 100 as well as mapping and coordinating with other units that may be operating within a network.

The lidar sensors 907 as well as the radar sensors 908 may be used for detection and depth perception of objects during navigation of the apparatus 100. The lidar sensors 907 may also be used to assist with mapping the environment in which the apparatus 100 operates. By way of non-limiting example, the lidar sensors 907 may assist with creating a floor plan of an environment in which the apparatus 100 will operate. The activity processor 204 may use this information in conjunction with GPS coordinates and data to navigate the apparatus 100 through a particular environment. Likewise, cellular and WiFi communication may be used by the activity processor 204 to communicate with a central server to assist with directing the apparatus 100 within a pre-mapped environment. Cellular and WiFi communication may also be used to provide updates to the activity processor 204 as well as to provide additional instructions for the apparatus 100.

At least one camera 910 may be located on the front portion 112 of the housing 102. Other camera 910 locations may include the sides and back portion 114 of the apparatus 100. The camera 910 may assist with identifying an object and may also work in conjunction with the lidar sensors 907, which may determine an object's depth and distance from the apparatus 100. In some embodiments, the camera 910 may be used in conjunction with the activity processor 204 to identify an object that is not able to be disposed within the apparatus 100. By way of non-limiting example, the activity processor 204 may signal one or both of the upper housing LEDs 911 and lower housing LEDs 912 to illuminate red if an object has been identified as unallowable or too large to be disposed within the apparatus 100. Furthermore, the camera 910 may be structured to record obstacles in the driving path of the apparatus 100 and relay the recording to the motor processor 407. The motor processor 407 may then recognize the obstacle and signal the wheels 210 to maneuver around the obstacles.

In some embodiments, ultrasonic sensors 908 may be used to navigate around objects that are in close proximity to the apparatus 100. This may assist with navigating around walls, people, and ledges such as stairs. The ultrasonic sensors 908 may be located on the bottom 103 of the apparatus 100 as well as around a lower portion of the housing 102 proximate the other sensors. The apparatus 100 may be structured to detect obstacles in its driving path utilizing the ultrasonic sensors 915, lidar sensors 907, and/or radar 925 and relay that data to the motor processor 407 for recognition and to signal the wheels 210 to maneuver around the obstacles.

In some embodiments the apparatus 100 may be equipped with a radio frequency transmitter. Working in conjunction with the activity processor 204, the radio frequency transmitter may allow for the apparatus 100 to open garage doors so that the apparatus 100 may either exit or enter a dwelling. By way of non-limiting example, the radio frequency transmitter may also allow for the apparatus 100 to open gates, trash shoots, and elevator doors autonomously.

In some embodiments, the activity processor 204 may receive voice commands via a microphone 915 positioned proximate the user interface 116. This may either supplement or override user control of the apparatus 100.

That which is claimed is:

1. An autonomously propelled waste receptacle comprising:
    a top;
    a collapsible lid;
    a housing comprising
        a circuit board panel,
        a door, and
        doorway;
    an exterior comprising
        a user interface,
        a plurality of sensors,
        at least one antenna, and
        a camera;
    an interior comprising
        a bin,
        a trash compactor comprising
            a plurality of threaded rods connected to the collapsible lid,
        an upper can platform, and
        a bottom tech platform;
    a bottom comprising
        a pair of motorized wheels, and
        a pair of unmotorized wheels;
    wherein a portion of the collapsible lid is configured to rotate into a downward orientation, defined as an open position;
    wherein the collapsible lid is configured as a masher operable to descend the interior of the autonomously propelled waste receptacle via the threaded rods and compact trash within the bin;
    wherein the user interface is configured as an override to automated features of the autonomously propelled waste receptacle;
    wherein the plurality of sensors includes at least one of lidar sensors, ultrasonic sensors, and radar on the autonomously propelled waste receptacle housing;
    wherein the camera is configured to assist with navigation and object identification;
    wherein the bin is configured to rotate from a vertical position, defined as a receiving position, to an angled position defined as an emptying position;
    wherein the door is configured to rotate into an open orientation allowing the bin to pass through the doorway when the bin is converting to an emptying position;
    wherein the autonomously propelled waste receptacle is configured to navigate using at least one of the plurality of sensors, camera, WiFi communication, cellular communication, and global positioning system (GPS) communication;
    wherein the at least one antenna is configured to send and receive at least one of cellular signals, WiFi signals, and GPS signals and data; and
    wherein the autonomously propelled waste receptacle is configured to use the motorized wheels and unmotorized wheels to drive.

2. The autonomously propelled waste receptacle of claim 1 wherein the collapsible lid comprises a backstop configured to secure the collapsible lid in a closed position when being used as a masher.

3. The autonomously propelled waste receptacle of claim 1 further comprising a plurality of L-shaped arms connected to the collapsible lid and the plurality of threaded rods; and wherein the L-shaped arms are configured to extend the collapsible lid into the bin when the collapsible lid is acting as a masher.

4. The autonomously propelled waste receptacle of claim 3 wherein the L-shaped arms include a lateral portion connected to a respective threaded rod and a longitudinal portion connected to the collapsible lid.

5. The autonomously propelled waste receptacle of claim 4 wherein the masher is configured to descend into the bin by a length equal to the longitudinal portion of the L-shaped arms.

6. The autonomously propelled waste receptacle of claim 1 wherein each motorized wheel and unmotorized wheel comprises a plurality of wheel subsets configured to facilitate maneuvering the autonomously propelled waste receptacle in multiple directions.

7. The autonomously propelled waste receptacle of claim 1 wherein the upper can platform is oriented above the bottom tech platform by a plurality of risers extending from the bottom tech platform to the upper can platform.

8. The autonomously propelled waste receptacle of claim 1 wherein the upper can platform comprises a scale configured to weigh refuse deposited in the autonomously propelled waste receptacle.

9. An autonomously propelled waste receptacle comprising:
a top comprising
a top opening, a top underside with a plurality of top Light Emitting Diodes (LEDs) affixed thereon, and an upper ridge comprising a disinfectant spray actuator;
a collapsible lid comprising
a lid axle, a static panel, a downward rotating panel, and a backstop;
a housing comprising
a circuit board panel with a printed circuit board (PCB) affixed thereon, an activity processor, a door and doorway;
an exterior comprising
a user interface, a plurality of sensors, at least one antenna, a camera, a plurality of LEDs circumscribing an upper portion, and a plurality of LEDs circumscribing a lower portion;
an interior comprising
a bin, a trash compactor system comprising a plurality of threaded rods connected to the collapsible lid, an upper can platform, a bottom tech platform comprising a plurality of bottom motors, a motor processor, and an upper chamber positioned between the collapsible lid and the top comprising at least one chamber sensor and at least one chamber motor;
a bottom comprising
at least one pair of motorized wheels;
wherein the downward rotating panel is configured to pivot from a horizontal closed position into a downward orientation, defined as an open position;
wherein the chamber sensor is configured to recognize when an object has entered the upper chamber so as to signal the motor processor to actuate the chamber motor and pivot the downward rotating panel into an open position;
wherein the motor processor is configured to signal the top LEDs and the disinfectant actuator to initialize for a period of time when the collapsible lid has returned to a closed position;
wherein the collapsible lid is configured as a masher operable to descend the interior of the autonomously propelled waste receptacle via the threaded rods and compact trash within the bin;
wherein the user interface is configured as an override to automated features of the autonomously propelled waste receptacle;
wherein the plurality of sensors includes at least one of lidar sensors, ultrasonic sensors, and radar on the autonomously propelled waste receptacle housing;
wherein the camera is configured to assist with navigation and object identification;
wherein the bin is configured to rotate from a vertical position, defined as a receiving position, to an angled position defined as an emptying position;
wherein the door is configured to rotate into an open orientation allowing the bin to pass through the doorway when the bin is converting to an emptying position;
wherein the autonomously propelled waste receptacle is configured to navigate using at least one of the plurality of sensors, camera, WiFi communication, cellular communication, and global positioning system (GPS) communication;
wherein the at least one antenna is configured to send and receive at least one of cellular signals, WiFi signals, and GPS signals and data; and
wherein the autonomously propelled waste receptacle is configured to use the motorized wheels to drive.

10. The autonomously propelled waste receptacle of claim 9 wherein the bin is configured to rotate along a bin axle; and wherein the bin axle is configured to rotate by a sprocket-wheel and chain operable by a motor on the upper can platform.

11. The autonomously propelled waste receptacle of claim 9 wherein the bin comprises one curved longitudinal surface and a plurality of uncurved longitudinal surfaces.

12. The autonomously propelled waste receptacle of claim 9 wherein a plurality of support pillars run the longitudinal length of the interior extending from the upper can platform to the top.

13. The autonomously propelled waste receptacle of claim 12 wherein the threaded rods and their respective motors are located between at least two pairs of support pillars.

14. The autonomously propelled waste receptacle of claim 9 wherein the motorized wheels comprise a plurality of wheel subsets configured to facilitate maneuvering the autonomously propelled waste receptacle in multiple directions.

15. The autonomously propelled waste receptacle of claim 9 wherein the camera is configured to record obstacles in the driving path of the autonomously propelled waste receptacle and relay the recording to the motor processor, and wherein the motor processor is configured to recognize the obstacles and signal the motorized wheels to maneuver around the obstacles.

16. The autonomously propelled waste receptacle of claim 9 wherein at least one of the lidar sensors, ultrasonic sensors, and radar is configured to detect obstacles in the driving path of the autonomously propelled waste receptacle and relay that data to the motor processor; and wherein the motor processor is configured to recognize the data and signal the motorized wheels to maneuver around the obstacles.

17. An autonomously propelled waste receptacle comprising:

a top comprising
  a top opening, a top underside with a plurality of top Light Emitting Diodes (LEDs) affixed thereon, an upper ridge comprising a disinfectant spray actuator, and motorized pivot system configured to rotate the top into an angled position;
a collapsible lid comprising
  a lid axle, a static panel, a downward rotating panel, and a backstop;
a housing comprising
  a circuit board panel with a printed circuit board (PCB) affixed thereon, an activity processor, a door and doorway;
an exterior comprising
  a user interface, a plurality of sensors, at least one antenna, a camera, a plurality of LEDs circumscribing an upper portion, and a plurality of LEDs circumscribing a lower portion;
an interior comprising
  a bin, a trash compactor system comprising a plurality of threaded rods connected to the collapsible lid, an upper can platform, a bottom tech platform comprising a plurality of bottom motors, a motor processor, and an upper chamber positioned between the collapsible lid and the top comprising at least one chamber sensor and at least one chamber motor;
a bottom comprising
  at least one pair of motorized wheels;
wherein the downward rotating panel is configured to pivot from a horizontal closed position into a downward orientation, defined as an open position;
wherein the chamber sensor is configured to recognize when an object has entered the upper chamber so as to signal the motor processor to actuate the chamber motor and pivot the downward rotating panel into an open position;
wherein the motor processor is configured to signal the top LEDs and the disinfectant actuator to initialize for a period of time when the collapsible lid has returned to a closed position;
wherein the collapsible lid is configured as a masher operable to descend the interior of the autonomously propelled waste receptacle via the threaded rods and compact trash within the bin;
wherein the user interface is configured as an override to automated features of the autonomously propelled waste receptacle;
wherein the plurality of sensors includes at least one of lidar sensors, ultrasonic sensors, and radar on the autonomously propelled waste receptacle housing;
wherein the plurality of top LEDs is configured to emit at least one of ultraviolet light with wavelengths between the range of 10-400 nanometers and visible light with wavelengths between the range of 400-700 nanometers;
wherein the camera is configured to assist with navigation and object identification;
wherein the bin is configured to rotate from a vertical position, defined as a receiving position, to an angled position defined as an emptying position;
wherein the door is configured to rotate into an open orientation allowing the bin to pass through the doorway when the bin is converting to an emptying position;
wherein the autonomously propelled waste receptacle is configured to navigate using at least one of the plurality of sensors, camera, WiFi communication, cellular communication, and global positioning system (GPS) communication;
wherein the at least one antenna is configured to send and receive at least one of cellular signals, WiFi signals, and GPS signals and data;
wherein the activity processor is configured to orient the autonomously propelled waste receptacle within a geographic area using information from the at least one of cellular signals, WiFi signals, and GPS signals and data;
wherein the lower tech platform comprises a plurality of wheel apertures configured to accommodate the motorized wheels therethrough; and
wherein the autonomously propelled waste receptacle is configured to use the motorized wheels to drive.

18. The autonomously propelled waste receptacle of claim 17 wherein the top is configured to rotate into an angled position and the top underside LEDs are configured to activate as headlights in a driving direction.

19. The autonomously propelled waste receptacle of claim 17 wherein the plurality of lights circumscribing the upper portion and plurality of lights circumscribing the lower portion are on the exterior and configured to illuminate in a semicircle in the direction the autonomously propelled waste receptacle is moving.

20. The autonomously propelled waste receptacle of claim 17 wherein at least a portion of the plurality of lights circumscribing the upper portion and plurality of lights circumscribing the lower portion are configured to illuminate green when the autonomously propelled waste receptacle is moving, red when stopped, and flashing yellow when compacting.

* * * * *